(12) United States Patent
Gomez-Mower et al.

(10) Patent No.: US 12,378,156 B2
(45) Date of Patent: Aug. 5, 2025

(54) SALT BATH COMPOSITIONS FOR STRENGTHENING GLASS ARTICLES, METHODS FOR USING THE SALT BATH COMPOSITIONS TO STRENGTHEN GLASS ARTICLES, AND GLASS ARTICLES STRENGTHENED THEREBY

(71) Applicant: CORNING INCORPORATED, Corning, NY (US)

(72) Inventors: Sinue Gomez-Mower, Corning, NY (US); Yuhui Jin, Painted Post, NY (US); Aize Li, Painted Post, NY (US); Kelly Ann Murphy, Phoenixville, PA (US); Carlton Maurice Truesdale, Conyers, GA (US)

(73) Assignee: CORNING INCORPORATED, Corning, NY (US)

( * ) Notice: Subject to any disclaimer, the term of this patent is extended or adjusted under 35 U.S.C. 154(b) by 554 days.

(21) Appl. No.: 17/631,595

(22) PCT Filed: Jul. 7, 2020

(86) PCT No.: PCT/US2020/040983
§ 371 (c)(1),
(2) Date: Jan. 31, 2022

(87) PCT Pub. No.: WO2021/021393
PCT Pub. Date: Feb. 4, 2021

(65) Prior Publication Data
US 2022/0332635 A1    Oct. 20, 2022

Related U.S. Application Data

(60) Provisional application No. 62/880,969, filed on Jul. 31, 2019.

(51) Int. Cl.
*C03C 21/00* (2006.01)

(52) U.S. Cl.
CPC .......... *C03C 21/002* (2013.01); *C03C 2203/50* (2013.01)

(58) Field of Classification Search
CPC ...... C03C 21/0002; C03C 21/002–006; C03C 21/008
See application file for complete search history.

(56) References Cited

U.S. PATENT DOCUMENTS

| 2,888,495 A | 5/1959 | Kissling |
| 3,081,256 A | 3/1963 | Hendal et al. |

(Continued)

FOREIGN PATENT DOCUMENTS

| AU | 2013211472 B2 | 3/2016 |
| CA | 1211075 A | 9/1986 |

(Continued)

OTHER PUBLICATIONS

CN 104556649 A (Han) 2015-04-29 (English language translation). [online] [retrieved Jun. 18, 2024]. Retrieved from: Clarivate Analytics. (Year: 2015).*

(Continued)

*Primary Examiner* — Erin Snelting
(74) *Attorney, Agent, or Firm* — Chandra J. Duncan

(57) ABSTRACT

The methods generally include contacting an alkali-containing glass article having a first alkali metal cation with a molten salt bath including from 0.1 wt. % to 3 wt. % nanoparticles and at least one alkali metal salt having a second alkali metal cation that has an atomic radius larger than an atomic radius of the first alkali metal cation. The nanoparticles may include at least one of metalloid oxide nanoparticles and metal oxide nanoparticles. The methods also include maintaining contact of the glass article with the (Continued)

molten salt bath to allow the first alkali metal cations to be exchanged with the second alkali metal cations of the molten salt bath. Further, the methods may include removing the glass article from contact with the molten salt bath to produce a strengthened glass article. A Surface Hydrolytic Resistance titration volume of the strengthened glass article may be less than 1.5 mL.

7 Claims, 5 Drawing Sheets

(56) References Cited

U.S. PATENT DOCUMENTS

| | | | |
|---|---|---|---|
| 3,336,731 | A | 8/1967 | Phillips et al. |
| 3,385,759 | A | 5/1968 | Bettis et al. |
| 3,395,999 | A | 8/1968 | Lewek |
| 3,441,398 | A | 4/1969 | Hess |
| 3,711,393 | A | 1/1973 | Garfinkel |
| 3,730,871 | A | 5/1973 | Boffe |
| 3,933,127 | A | 1/1976 | Arps |
| 4,477,373 | A | 10/1984 | Grantham et al. |
| 4,689,146 | A | 8/1987 | Kasai et al. |
| 5,015,288 | A | 5/1991 | Kusik et al. |
| 5,039,631 | A | 8/1991 | Krashkevich et al. |
| 5,077,240 | A | 12/1991 | Hayden et al. |
| 5,846,278 | A | 12/1998 | Jantzen et al. |
| 6,190,548 | B1 | 2/2001 | Frick |
| 6,436,858 | B1 | 8/2002 | Laborde et al. |
| 6,534,120 | B1 | 3/2003 | Ozawa et al. |
| 7,419,530 | B2 | 9/2008 | De Vries et al. |
| 8,551,898 | B2 | 10/2013 | Danielson et al. |
| 8,834,806 | B2 | 9/2014 | Mizrahi |
| 8,956,424 | B2 | 2/2015 | Yang |
| 8,980,777 | B2 | 3/2015 | Danielson et al. |
| 10,202,300 | B2 | 2/2019 | Hart et al. |
| 10,556,826 | B2 | 2/2020 | Amin et al. |
| 2003/0110802 | A1 | 6/2003 | Jensen et al. |
| 2005/0181931 | A1 | 8/2005 | Mouri et al. |
| 2009/0241731 | A1 | 10/2009 | Pereira et al. |
| 2012/0210749 | A1 | 8/2012 | Feng et al. |
| 2013/0219965 | A1 | 8/2013 | Allan et al. |
| 2014/0366579 | A1 | 12/2014 | Antoine et al. |
| 2015/0152344 | A1 | 6/2015 | Gueh |
| 2016/0200629 | A1 | 7/2016 | Ikawa et al. |
| 2017/0282503 | A1 | 10/2017 | Peng et al. |
| 2017/0305788 | A1 | 10/2017 | Nikulin |
| 2018/0002224 | A1* | 1/2018 | Gaylo .................. C03C 21/008 |
| 2018/0148373 | A1 | 5/2018 | Harris et al. |
| 2018/0327305 | A1 | 11/2018 | Amin et al. |
| 2018/0362399 | A1 | 12/2018 | Amin et al. |
| 2019/0062207 | A1 | 2/2019 | Jin |
| 2020/0102244 | A1 | 4/2020 | Li et al. |
| 2020/0171478 | A1 | 6/2020 | Bernard et al. |
| 2020/0172434 | A1 | 6/2020 | Dafin et al. |
| 2022/0081357 | A1 | 3/2022 | Gomez-Mower et al. |
| 2022/0281769 | A1 | 9/2022 | Sekiya et al. |

FOREIGN PATENT DOCUMENTS

| | | |
|---|---|---|
| CN | 104310444 A | 1/2015 |
| CN | 104445293 A | 3/2015 |
| CN | 104556649 A * | 4/2015 |
| CN | 105555730 A | 5/2016 |
| CN | 105593177 A | 5/2016 |
| CN | 106629785 A | 5/2017 |
| CN | 107108305 A | 8/2017 |
| CN | 107207315 A | 9/2017 |
| CN | 107311205 A | 11/2017 |
| CN | 108290781 A | 7/2018 |
| CN | 108975667 A | 12/2018 |
| CN | 110342834 A | 10/2019 |
| CN | 209612365 U | 11/2019 |
| JP | 2015-151315 A | 8/2015 |
| JP | 6273816 B2 | 2/2018 |
| WO | 2014/045977 A1 | 3/2014 |
| WO | 2014/045979 A1 | 3/2014 |
| WO | 2015/080095 A1 | 6/2015 |

OTHER PUBLICATIONS

Shekarriz, M. et al. Systematic synthesis of high surface area silica nanoparticles in the sol-gel condition by using the central composite design (CCD) method. The Canadian Journal of Chemical Engineering, v. 92, n. 5, p. 828-834, 2013. (Year: 2013).*
Araujo et al; "Ion Exchange Equilibria Between Glass and Molten Salts"; Journal of Non-Crystalline Solids; 318; pp. 262-267 (2003).
Arthur "An investigation into the thermophysical and rheological properties of nanofluids for solar thermal applications" Renewable and Sustainable Energy Reviews 55 (2016) 739-755.
Bartholomew "A Study of the Equilibrium $KNO_3(I) \Leftrightarrow KNO_2(I) + 1/2O_2$ (g) Over the Temperature Range 550-750°" J. Phys. Chem. (1966) 3442-3446.
Freeman "The Kinetics of the Thermal Decomposition of Sodium Nitrate and of the Reaction Between Sodium Nitrite and Oxygen" J. Phys. Chem. 60(11) 1487-1493.
Freeman "The Kinetics of Thermal Decomposition of Potassium Nitrate and of the Reaction Between Potassium Nitrate and Oxygen" J. Am. Chem. Soc. (Feb. 20, 1957) 838-842.
International Search Report and Written Opinion of the International Searching Authority; PCT/US2021/044582; dated Nov. 15, 2021; 12 pages; European Patent Office.
International Search Report and Written Opinion of the International Searching Authority; PCT/US2020/040983; dated Oct. 15, 2020; pp. 9; European Patent Office.
International Search Report and Written Opinion of the International Searching Authority; PCT/US2021/019344; dated Jun. 24, 2021; 10 pages; European Patent Office.
Kramer "Differential Scanning Calorimetry of Sodium and Potassium Nitrates and Nitrites" Thermochimica Acta 55 (1982) 11-17.
Lindauer et al., "Design Construction and Testing of a Large Molten Salt Filter", Oak Ridge National Laboratory (1969).
McCabe et al., "Unit Operations in Chemical Engineering" Fourth Edition 1985 pp. 749-758.
Xiao-Fu et al., "Separation of sodium and potassium using adsorption-elution/crystallization scheme from bittern", Chemical Engineering Research and Design, vol. 161, 2020, pp. 72-81.
Chinese Patent Application No. 202180076527.0, Office Action dated May 19, 2025, 5 pages (English Translation only), Chinese Patent Office.

* cited by examiner

SALT BATH COMPOSITIONS FOR STRENGTHENING GLASS ARTICLES, METHODS FOR USING THE SALT BATH COMPOSITIONS TO STRENGTHEN GLASS ARTICLES, AND GLASS ARTICLES STRENGTHENED THEREBY

CROSS REFERENCE TO RELATED APPLICATION

This is a national stage application under 35 U.S.C. § 371 of International Application No. PCT/US2020/040983, filed Jul. 7, 2020, which claims the benefit of priority under 35 U.S.C § 120 of U.S. Provisional Application Ser. No. 62/880,969 filed on Jul. 31, 2019, the content of which is relied upon and incorporated herein by reference in its entirety.

TECHNICAL FIELD

The present specification generally relates to methods for chemically strengthening glass articles and, more particularly, to salt bath compositions for use during such strengthening and glass articles strengthened thereby.

BACKGROUND

Tempered or strengthened glass may be used in a variety of applications. For example, strengthened glass may be used in consumer electronic devices, such as smart phones and tablets, because of its physical durability and resistance to breakage. Strengthened glass may also be used in pharmaceutical packaging. In such applications, the chemical durability of the glass, in addition to the physical durability, is important to prevent contamination of the contents of the pharmaceutical package. However, conventional strengthening processes, such as conventional ion exchange processes, may decrease the chemical durability of the glass. This may be caused, at least in part, by the degradation and/or decomposition of the molten salt baths utilized for ion exchange.

Accordingly, a need exists for alternative salt bath compositions for strengthening glass articles.

SUMMARY

According to a first aspect, a method of strengthening an alkali-containing glass article including a first alkali metal cation includes contacting at least a portion of the glass article with a molten salt bath including from 0.1 wt. % to 3 wt. % of nanoparticles and at least one alkali metal salt including a second alkali metal cation. The nanoparticles include at least one of metalloid oxide nanoparticles and metal oxide nanoparticles. An atomic radius of the second alkali metal cation is larger than an atomic radius of the first alkali metal cation. The method further includes maintaining contact of the at least a portion of the glass article with the molten salt bath to allow the first alkali metal cations in the glass article to be exchanged with the second alkali metal cations of the molten salt bath. The method also includes removing the at least a portion of the glass article from contact with the molten salt bath to produce a strengthened glass article. A Surface Hydrolytic Resistance titration volume of the strengthened glass article is less than 1.5 mL.

A second aspect includes the method of the first aspect wherein the molten salt bath comprises at least one of $NaNO_3$ and $KNO_3$.

A third aspect includes the method of any of the first or second aspects wherein the nanoparticles comprise $SiO_2$, $Al_2O_3$, $TiO_2$, BeO, or a combination of two or more of $SiO_2$, $Al_2O_3$, $TiO_2$ and BeO.

A fourth aspect includes the method of any of the first through third aspects wherein the metal oxide nanoparticles have an average surface area of from 300 $m^2/g$ to 600 $m^2/g$.

A fifth aspect includes the method of any of the first through fourth aspects wherein the nanoparticles have an average particle size of from 1 nm to 25 nm.

A sixth aspect includes the method of any of the first through fifth aspects wherein a pH of the molten salt bath is from 6 to 8.

A seventh aspect includes the method of any of the first through sixth aspects wherein the glass article is a glass pharmaceutical package.

An eight aspect includes the method of any of the first through seventh aspects wherein the glass article is a glass vial.

A ninth aspect includes the method of any of the first though eight aspects wherein a temperature of the salt bath is from 350° C. to 500° C.

A tenth aspect includes the method of any of the first through ninth aspects that further comprising washing the strengthened glass article to remove at least a portion of the metal oxide nanoparticles.

According to an eleventh aspect, a salt bath system for strengthening an alkali-containing glass article including a first alkali metal cation includes a salt bath including from 0.1 wt. % to 3 wt. % nanoparticles and at least one alkali metal salt comprising a second alkali metal cation. The nanoparticles include at least one of metalloid oxide nanoparticles and metal oxide nanoparticles. An atomic radius of the second alkali metal cation is larger than an atomic radius of the first alkali metal cation. The at least one alkali metal salt is capable of decomposing to at least one of an alkali metal nitrite, an alkali metal oxide, or an alkali hydroxide. The nanoparticles are capable of actively reacting with the at least one of the alkali metal nitrite, the alkali metal oxide, or the alkali hydroxide in order to form a product that does not interact with a surface of the glass article.

A twelfth aspect includes the system of the eleventh aspect wherein the alkali metal salt comprises $NaNO_3$, $KNO_3$, $RbNO_3$, $CsNO_3$, or any combination thereof.

A thirteenth aspect includes the system of any of the eleventh or twelfth aspects wherein the nanoparticles comprise $SiO_2$, $Al_2O_3$, $TiO_2$, BeO, or any combination thereof.

A fourteenth aspect includes the system of any of the eleventh through thirteenth aspects wherein the alkali metal cation comprises $KNO_3$ and the at least one metal oxide nanoparticle comprises $SiO_2$.

A fifteenth aspect includes the system of the fourteenth aspect wherein at least a portion of the $KNO_3$ decomposes to at least one of $KNO_2$, $K_2O$, or KOH.

A sixteenth aspect includes the system of the fifteenth aspect wherein at least a portion of the $SiO_2$ reacts with the at least one of $KNO_2$, $K_2O$, or KOH to form $K_2SiO_3$.

A seventeenth aspect includes the system of any of the eleventh through sixteenth aspects wherein the nanoparticles have an average surface area of from 300 $m^2/g$ to 600 $m^2/g$.

An eighteenth aspect includes the system of any of the eleventh through seventeenth aspects wherein the nanoparticles have an average particle size of from 1 nm to 25 nm.

A nineteenth aspect includes the system of any of the eleventh though eighteenth aspects wherein the nanoparticles comprise at least 90 wt. % of at least one of metal oxide nanoparticles and metalloid oxide nanoparticles.

A twentieth aspect includes the system of any of the eleventh through nineteenth aspects wherein a pH of the salt bath is from 6 to 8.

A twenty-first aspect includes the system of any of the eleventh through twentieth aspects wherein a temperature of the salt bath is from 350° C. to 500° C.

A twenty-second aspect includes the system of any of the eleventh through twenty-first aspects wherein the salt bath further comprises at least one alkaline earth metal cation and the nanoparticles are capable of actively reacting with the at least one alkaline earth metal cation in order to form a product that does not deposit on the surface of the glass article.

Additional features and advantages of the compositions, methods, and articles described herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
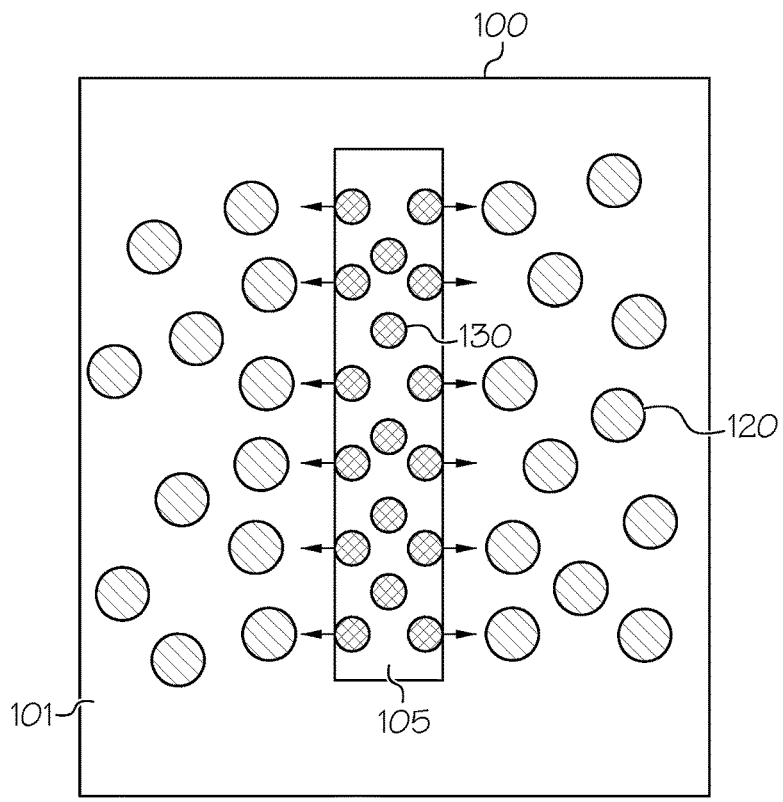
FIG. 1A schematically depicts a conventional ion exchange process.

Embodiments described herein are directed to systems and methods for minimizing the concentration of decomposition products in salt baths used in ion exchange processes to extend salt bath life and maintain the chemical durability of strengthened alkali-containing glass articles over time. The methods generally include contacting at least a portion of an alkali-containing glass article having a first alkali metal cation with a molten salt bath including from 0.1 wt. % to 3 wt. % nanoparticles and at least one alkali metal salt having a second alkali metal cation that has an atomic radius larger than an atomic radius of the first alkali metal cation. The nanoparticles may include at least one of metalloid oxide nanoparticles and metal oxide nanoparticles. The methods may also include maintaining contact of the at least a portion of the glass article with the molten salt bath to allow the first alkali metal cations to be exchanged with the second alkali metal cations of the molten salt bath. Further, the methods may include removing the at least a portion of the glass article from contact with the molten salt bath to produce a strengthened glass article. A Surface Hydrolytic Resistance titration volume of the strengthened glass article may be less than 1.5 mL. Various embodiments of the systems and methods will be described herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the terms "ion exchange bath," "salt bath," and "molten salt bath," are, unless otherwise specified, equivalent terms, and refer to the solution or medium used to effect the ion exchange process with a glass (or glass-ceramic) article, in which cations within the surface of a glass article are replaced or exchanged with cations that are present in the salt bath. It is understood that a salt bath may include at least one alkali metal salt, such as potassium nitrate ($KNO_3$) and/or sodium nitrate ($NaNO_3$), which may be liquefied by heat or otherwise heated to a substantially liquid phase.

As used herein, the terms "substrate" and "article" are, unless otherwise specified, equivalent terms, referring to a glass material of any shape or form including, but not limited to, sheets, vials, three dimensional glass articles, and the like.

As used herein, the terms "cation" and "ion" are considered equivalent terms, unless otherwise specified. The terms "cation" and "ion" can also refer to one or more cations. While potassium and sodium cations and salts are used in embodiments, it should be understood that embodiments of the disclosure are not limited to these species. The scope of the present disclosure also includes other metal salts and ions, particularly cations and salts of alkali metals, as well as those of other monovalent metals.

As used herein, the term "chemical durability" refers to the ability of the glass composition to resist degradation upon exposure to specified chemical conditions. Specifically, the chemical durability of the glass articles described herein was assessed in water according to the "Surface Glass Test" of USP <660>"Containers—Glass".

As used herein, the singular forms "a," "an," and "the" include plural referents unless the context clearly dictates otherwise. Thus, for example, reference to "a" component includes aspects having two or more such components, unless the context clearly indicates otherwise.

Figure 1B:
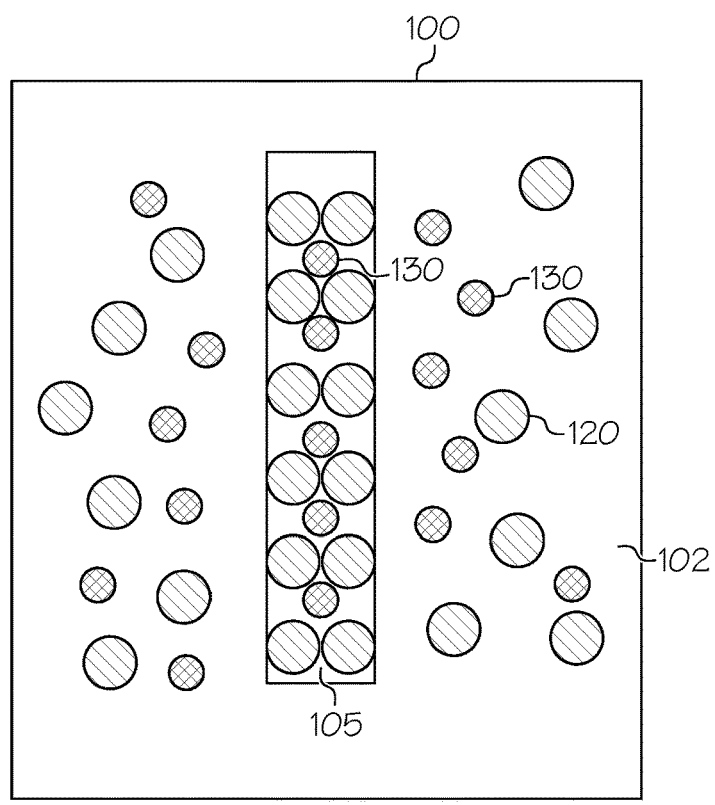
FIG. 1B schematically depicts a conventional ion exchange process.

Referring initially to FIGS. 1A and 1B, a conventional ion exchange process is schematically depicted. The ion exchange process depicted in FIGS. 1A and 1B includes immersing (FIG. 1A) a glass article 105 in a salt bath 100. In embodiments, the glass article 105 may comprise a silicate glass, such as a borosilicate glass or an aluminosilicate glass, that meets the Type I glass criteria, as detailed by the United States Pharmacopeia (USP) <660>"Containers—Glass". Type I glass generally has a relatively high hydrolytic resistance and a relatively high thermal shock resistance. In embodiments, the glass article 105 may comprise a Type III glass, as detailed by the USP <660>. Type III glass is a soda-lime-silica glass. Type III glass has a moderate hydrolytic resistance. In embodiments, the glass article 105 may comprise a Type II glass, as detailed by the USP <660>. Type II glass is a Type III glass that has been exposed to a surface treatment improve the hydrolytic resistance of the glass.

The glass article 105 may contain relatively smaller cations 130, for example, alkali metal cations such as Li$^+$ and/or Na$^+$ cations, and the salt bath 100 may include molten salt 101 containing larger cations 120 (i.e., relative to the cations 130 of the glass article) at an elevated temperature. That is, the larger cations 120 may have an atomic radius larger than an atomic radius of the smaller cations 130. The larger alkali metal cations 120 may include, for example, alkali metal cations such as K$^+$ and/or Na$^+$ cations, which have disassociated from KNO$_3$ and/or NaNO$_3$ present in the salt bath 100. The smaller cations 130 within the glass article 105 diffuse from the glass article 105 into the salt bath 100 while larger cations 120 from the salt bath 100 replace the smaller cations 130 in the glass article 105. This substitution (FIG. 1B) of larger cations 120 for smaller cations 130 in the glass article 105 creates a surface compressive stress (CS) at the surface of the glass article 105 which extends to a depth of compression (DOC), thus improving the resistance of the glass article 105 to breakage.

It has been found that, during the ion exchange process, the alkali metal salt present in the salt bath may decompose into alkali metal nitrites and/or alkali metal oxides. The decomposition of an alkali metal nitrate into an alkali metal nitrite is indicated in the following equation:

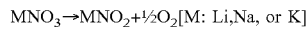

Both alkali metal nitrates and alkali metal nitrites may further decompose into alkali metal oxides, as indicated in the following equation:

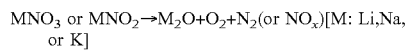

For example, in instances where KNO$_3$ salt is used in the salt bath, it has been found that the KNO$_3$ decomposes into two primary decomposition products at bath temperatures greater than about 400° C.: potassium nitrite (KNO$_2$) and potassium oxide (K$_2$O). In instances where NaNO$_3$ salt is used in the salt bath, it has been determined that the NaNO$_3$ may decompose into both NaNO$_2$ and Na$_2$O at lower temperatures than KNO$_3$ (i.e., temperatures less than about 400° C.). Similarly, in instances where LiNO$_3$ salt is used in the salt bath, it has been determined that the LiNO$_3$ may decompose into both LiNO$_2$ and Li$_2$O at even lower temperatures than NaNO$_3$.

It has been determined that the presence of alkali metal oxides, such as K$_2$O, in a salt bath may degrade the properties of the glass articles treated therein. In particular, it has been found that alkali metal oxides in the salt bath etch the surface of glass articles during ion exchange due to the formation of alkali hydroxides, such as potassium hydroxide (KOH), from the hydrolysis of the alkali metal oxides in the salt bath. The etching degrades the surface of the glass article which, in turn, may adversely impact the chemical durability of the glass article.

For example, the glass articles may be glass pharmaceutical packages, such as glass vials or the like. It has been found that ion exchanging the glass pharmaceutical packages at elevated process temperatures, such as temperatures of approximately 800° C. or greater, decreases the resistance of the glass pharmaceutical packages to degradation in water (i.e., the surface hydrolytic resistance or SHR) as determined by the USP <660> testing standard. Higher ion exchange process temperatures are generally used to decrease the time of the ion exchange process for achieving a particular depth of compression and/or surface compressive stress, thereby improving production throughput and manufacturing efficiencies. However, the degradation of the SHR of the glass articles may necessitate the use of lower ion exchange process temperatures, thereby decreasing production throughput and manufacturing efficiencies.

The salt bath compositions and methods for using the same described herein may be used to prevent the degradation of the surface hydrolytic resistance of glass articles as a result of the ion exchange process, thereby extending the usable temperature range of the salt bath and improving production throughput and manufacturing efficiencies.

In particular, embodiments of the present disclosure include salt bath compositions that include nanoparticles, such as metalloid oxide or metal oxide nanoparticles. The nanoparticles react with the decomposition products of the molten salt, creating an unreactive product thereby reducing or mitigating etching of the surface of the glass articles treated therein which, in turn, mitigates degradation of the surface hydrolytic resistance of the glass articles.

In embodiments described herein, a glass article containing a first alkali metal cation may be strengthened through ion exchange processes that utilize molten salt baths. In embodiments, at least a portion of the glass article is contacted with the molten salt of the molten salt bath. As used herein, the term "contact" may include immersion, or at least partial immersion, in the molten salt bath. The glass article may be contacted with the molten salt bath for a treatment time sufficient to create a surface compressive stress at the surface of the glass article that extends to a depth of compression. In embodiments, the glass article may be contacted with the molten salt bath for a treatment time of from about 20 minutes to about 20 hours. For example, the glass article may be contacted with the molten salt bath for a treatment time of from about 20 minutes to about 15 hours, from about 20 minutes to about 10 hours, from about 20 minutes to about 5 hours, from about 20 minutes to about 1 hour, from about 1 hour to about 20 hours, from about 1 hour to about 15 hours, from about 1 hour to about 10 hours, from about 1 hour to about 5 hours, from about 5 hours to about 20 hours, from about 5 hours to about 15 hours, from about 5 hours to about 10 hours, from about 10 hours to about 20 hours, from about 10 hours to about 15 hours, or from about 15 hours to about 20 hours.

In embodiments, the salt bath composition comprises an alkali metal salt comprising a second alkali metal cation that is different than the first alkali metal cation of the glass article. In embodiments, the alkali metal salt may be, for example, an alkali metal nitrate. In the embodiments described herein, the second alkali metal cation in the alkali metal salt has an atomic radius larger than an atomic radius of the first alkali metal cation of the glass article. For example and without limitation, in embodiments the first alkali metal cation may be $Li^+$ and the second alkali metal cation may be $K^+$ and/or $Na^+$. Alternatively or additionally, the first alkali metal cation may be $Na^+$ and the second alkali metal cation may be $K^+$.

The relatively larger cations of the alkali metal salt may readily exchange with and replace the relatively smaller cations contained within the glass article. The smaller alkali metal cations diffuse from the glass article into the alkali metal salt of the salt bath while larger alkali metal cations from the alkali metal salt of the salt bath diffuse into the glass article and replace (i.e., exchange with) the smaller cations in the glass article. This substitution of larger alkali metal cations for smaller alkali metal cations in the glass article creates a compressive stress layer at the surface of the glass article that extends to a depth of compression, increasing the resistance of the glass article to breakage following mechanical insults (e.g., scratches, abrasions, etc.).

In embodiments, the salt bath composition may comprise at least one of $KNO_3$ and $NaNO_3$. In some embodiments, the salt bath may comprise a combination of $KNO_3$ and $NaNO_3$. In embodiments, the concentrations of $KNO_3$ and $NaNO_3$ in the salt bath composition may be balanced based on the composition of the glass article to provide an ion exchange that increases both the surface compressive stress at the surface of the glass article after the ion exchange process as well as the depth of compression after the ion exchange process. In embodiments, the salt bath composition comprises a greater concentration of $KNO_3$ than $NaNO_3$ based on the total concentration of the salt bath composition. In embodiments, the salt bath composition may comprise about 5 wt. % $KNO_3$ to about 95 wt. % $KNO_3$. For example, the salt bath composition may comprise from about 45 wt. % $KNO_3$ to about 50 wt. % $KNO_3$, or from about 75 wt. % $KNO_3$ to about 95 wt. % $KNO_3$. In embodiments, the salt bath composition may comprise from about 5 wt. % $NaNO_3$ to about 95 wt. % $NaNO_3$. For example, the salt bath composition may comprise from about 50 wt. % $NaNO_3$ to about 55 wt. % $NaNO_3$, or from about 5 wt. % $NaNO_3$ to about 25 wt. % $NaNO_3$. To achieve a deep depth of compression in the glass article, the salt bath composition may comprise a greater concentration of $NaNO_3$ and the glass article may be held in the salt bath composition for a longer treatment time to achieve the deeper depth of compression.

In embodiments, the salt bath composition may be heated to an elevated temperature sufficient to create a molten salt bath and thereby promote the ion exchange process. In embodiments, the salt bath composition may be heated to a temperature of from 350° C. to 500° C. For example, the salt bath composition may be heated to a temperature of from 350° C. to 475° C., from 350° C. to 450° C., from 350° C. to 425° C., from 350° C. to 400° C., from 350° C. to 375° C., from 375° C. to 500° C., from 375° C. to 475° C., from 375° C. to 450° C., from 375° C. to 425° C., from 375° C. to 400° C., from 400° C. to 500° C., from 400° C. to 475° C., from 400° C. to 450° C., from 400° C. to 425° C., from 425° C. to 500° C., from 425° C. to 475° C., from 425° C. to 450° C., from 450° C. to 500° C., from 450° C. to 475° C., or from 475° C. to 500° C. However, if the temperature of the molten salt bath is too high, it may be difficult to adequately control the ion exchange process and the rate of degradation of the alkali metal salts in the salt bath may increase.

As described herein, the alkali metal salt may decompose during the ion exchange process. The rate of decomposition of the alkali metal salt may increase as the temperature of the molten salt bath increases. In embodiments, the alkali metal salt may decompose into an alkali metal nitrite, an alkali metal oxide, an alkali hydroxide, or combinations thereof. For example, $KNO_3$ present within the molten salt bath may decompose into $KNO_2$, $K_2O$, KOH, or combinations thereof. This decomposition may occur directly (e.g., the reduction of $KNO_3$ to $KNO_2$) or indirectly (e.g., the reduction of $KNO_3$ or $KNO_2$ to $K_2O$ and the subsequent hydrolysis of $K_2O$ to KOH) from the alkali metal salt.

As noted herein, the decomposition products of the alkali metal nitrate may interact with the surface of the glass article. For example, an alkali hydroxide, such as KOH, may corrode or etch the surface of the glass article that, in turn, may reduce the chemical durability of the glass article. In particular, the corrosion or etching may reduce the surface hydrolytic resistance (SHR) of the glass article. Glasses with low SHR may degrade in water or aqueous solutions. In instances where the glass article is used as a glass pharmaceutical package, such as a glass container, glass vial, glass ampoule, or the like, the degradation of the glass may affect the efficacy of the contents of the glass pharmaceutical package. As noted herein, the SHR of the surface of a glass article may be measured by the Surface Glass Test, as detailed by the USP <660> standard. SHR is a measure of the chemical durability of the glass surface and is related to the solubility of glass components in a test solution. According to USP <660>, glasses classified as Type I glasses have a high hydrolytic resistance (e.g., a surface glass test resulting in a titrant volume less than or equal to 1.3 mL given a filling volume of 3-5 mL), making them suitable for containing most parenteral and non-parenteral compositions.

SHR, as detailed in the USP <660> standard, may be determined by filling a glass vial or container composed of the glass article with carbon dioxide-free or purified water. The filled vial is then subjected to an autoclave cycle at approximately 121° C. for approximately 1 hour. The resulting leachate within the vial is then titrated to neutral by a weak hydrochloric acid (e.g., 0.01 M HCl) in the presence of methyl red. The volume of titrant per 100 mL of leachate is used to determine the SHR of the glass article. Generally, a greater a titrant volume corresponds to an inferior chemical durability (that is, the leachate contains more glass components released by the glass and thus requires more titrant to offset the change in pH due to the presence of the glass components).

A low titrant volume and/or high chemical durability may be desired in strengthened glass articles. Generally, a titrant volume less than 1.5 mL is desired for Type I glasses. However, as described hereinabove, the presence of decomposition products, such as alkali hydroxides, within a molten salt bath used for ion exchange may corrode and/or etch the surface of the glass article. This etching may result in increased titrant volumes, which correspond to a decrease in chemical durability. Typically, the titrant volume of a strengthened glass article will increase as a function of the time spent undergoing ion exchange. That is, the longer a glass article is contacted with a molten salt bath, the greater the titrant volume. For example, a glass article that undergoes ion exchange for approximately 3 hours may result in a titrant volume of approximately 0.9 mL while a glass article that undergoes ion exchange for approximately 10 hours may result in a titrant volume of approximately 1.1 mL.

Typically, additives, which may react with the decomposition products of the molten salt, are included in the salt bath composition in order to minimize or eliminate any reduction in chemical durability of the strengthened glass article. However, many conventional additives produce inconsistent results due to various factors, such as poor circulation within the molten salt bath, high activation energy, or the generation of undesirable products. Furthermore, some conventional additives may be difficult to source in sufficient quantities necessary to meet the production demands of strengthened glass.

In this regard, the salt bath composition includes nanoparticles to mitigate the degradation of the SHR of the glass articles subjected to ion exchange in the salt bath. In embodiments, the nanoparticles may include metalloid oxide nanoparticles, metal oxide nanoparticles, or combinations thereof. For example, the nanoparticles may include at least one of silica ($SiO_2$) nanoparticles, alumina ($Al_2O_3$) nanoparticles, titania ($TiO_2$) nanoparticles, beryllia (BeO) nanoparticles, or various combinations thereof. The nanoparticles may be selected based upon their reactivity with the decomposition products of the alkali metal salt. For example, silica nanoparticles may react with KOH present within the molten salt bath to form potassium silicate ($K_2SiO_3$) and water. Similarly, alumina nanoparticles may react with sodium hydroxide (NaOH) present within the molten salt bath to form sodium aluminate ($NaAlO_2$) and water. That is, the nanoparticles react with the decomposition products of the alkali metal salt and form a product that does not react with (e.g., does not etch or corrode) the glass article. The presence of the nanoparticles may reduce the concentration of the decomposition products within the molten salt bath and, as a result, reduce the interactions between the decomposition products and the surface of the glass article. As such, the inclusion of nanoparticles within the molten salt bath may increase the chemical durability of the strengthened glass article when compared to glass articles subjected to ion exchange in conventional molten salt baths (i.e., molten salt baths which do not include nanoparticles).

In embodiments, the nanoparticles may also prevent unwanted alkali metal cations from depositing on the surface of the glass article. As described hereinabove, the glass article may release the first alkali metal cations into the molten salt bath during an ion exchange process. For example, $Na^{1+}$ cations or $Li^{1+}$ cations may be released from the glass article during ion exchange. However, as ion exchange progresses and the concentration of released cations increases, the released cations may deposit on the surface of the glass article. This may inhibit the second alkali metal cations present in the molten salt bath from entering the glass article. In embodiments, the nanoparticles may bind the alkali metal cations to the surface of the nanoparticles and prevent the movement of the alkali metal cations throughout the salt bath. As such, the nanoparticles may prevent the released first alkali metal cations from depositing on the surface of the glass article, increasing the efficiency of the ion exchange process.

In some embodiments, the nanoparticles may also prevent unwanted impurities, such as alkaline earth metal cations, from depositing on the surface of the glass article. Alkaline earth metal cations, such as $Ca^{2+}$ and/or $Mg^{2+}$, may be present in the salt bath as impurities. These alkaline earth metal cations may cause a layer of calcium and/or magnesium to form on the surface of the glass article. This layer may prevent alkali metal cations from releasing and/or entering the glass article, inhibiting the ion exchange process. As a result, the presence of alkaline earth metal cations in the salt bath may reduce the coefficient of linear thermal expansion (CTE) of the strengthened glass article. In embodiments, the nanoparticles may react with the alkaline earth metal cations to form alkaline earth silicates, such as, for example, calcium silicate ($CaSiO_3$), and prevent the formation of a layer on the surface of the glass article. As such, the nanoparticles may prevent impurities from inhibiting the ion exchange process and increase the CTE of the strengthened glass article.

In embodiments, the nanoparticles may also improve thermal conductivity of the salt bath. Without being bound by any particular theory, it is believed that this increase in thermal conductivity of the salt bath may improve the temperature uniformity of the salt bath and, as a result, the uniformity of the ion exchange processes conducted therein. That is, the compressive stress imparted in a glass article may be similar or identical across the surface of the glass article. Such a uniform ion exchange processes may reduce or prevent warping in thin glass articles that may occur as a result of asymmetrical compressive stresses.

The salt bath composition may include an amount of nanoparticles sufficient to effectively reduce the concentration of the at least one decomposition product within the molten salt bath. In embodiments, the salt bath composition may include from about 0.1 wt. % to about 3.0 wt. % of nanoparticles. For example, the salt bath composition may include from about 0.1 wt. % to about 2.5 wt. %, from about 0.1 wt. % to about 2.0 wt. %, from about 0.1 wt. % to about 1.5 wt. %, from about 0.1 wt. % to about 1.0 wt. %, from about 0.1 wt. % to about 0.5 wt. %, from about 0.5 wt. % to about 3.0 wt. %, from about 0.5 wt. % to about 2.5 wt. %, from about 0.5 wt. % to about 2.0 wt. %, from about 0.5 wt. % to about 1.5 wt. %, from about 0.5 wt. % to about 1.0 wt. %, from about 1.0 wt. % to about 3.0 wt. %, from about 1.0 wt. % to about 2.5 wt. %, from about 1.0 wt. % to about 2.0 wt. %, from about 1.0 wt. % to about 1.5 wt. %, from about 1.5 wt. % to about 3.0 wt. %, from about 1.5 wt. % to about 2.5 wt. %, from about 1.5 wt. % to about 2.0 wt. %, from about 2.0 wt. % to about 3.0 wt. %, from about 2.0 wt. % to about 2.5 wt. %, or from about 2.5 wt. % to about 3.0 wt. %. When the salt bath composition includes fewer nanoparticles (i.e., less than about 0.1 wt. %), the availability of the nanoparticles within the molten salt bath may not be sufficient to effectively interact with the decomposition products. In contrast, when the salt bath composition includes more nanoparticles (i.e., greater than about 3.0 wt. %), the excess nanoparticles may interfere with the ion exchange process.

The reaction rate constant (k) of the reaction between the nanoparticles and at least one decomposition product may be sufficient to effectively reduce the concentration of the at least one decomposition product within the molten salt bath. The reaction rate constant (k) of a reaction quantifies the rate of the reaction and, as such, a greater reaction rate constant (k) may indicate a greater ability of the nanoparticles to react with at least one of the decomposition products within the molten salt bath. That is, a greater reaction rate constant (k) may correlate with the ability of the nanoparticles to reduce interactions between the decomposition products and the surface of the glass article. In embodiments, the reaction rate constant (k) of the reaction between the nanoparticles and at least one decomposition product may be from about 0.5 to about 12. For example, the reaction rate constant (k) of the reaction between the nanoparticles and at least one decomposition product may be from about 0.5 to about 10, from about 0.5 to about 8, from about 0.5 to about 6, from about 0.5 to about 4, from about 0.5 to about 2, from about 2 to about 12, from about 2 to about 10, from about 2 to about 8, from about 2 to about 6, from about 2 to about 4, from about 4 to about 12, from about 4 to about 10, from about 4 to about 8, from about 4 to about 6, from about 6 to about 12, from about 6 to about 10, from about 6 to about 8, from about 8 to about 12, from about 8 to about 10, or from about 10 to about 12. When the reaction rate constant (k) is not sufficiently high (i.e., greater than or equal to 0.5), the concentration of the decomposition products may not be effectively reduced and, as such, the chemical durability of the glass article may be reduced.

In embodiments, the nanoparticles of the salt bath composition comprise an average surface area of at least 300 $m^2/g$, as measured by the Brunauer-Emmett-Teller (BET) method. For example, the nanoparticles of the salt bath composition may comprise an average surface area of from about 300 $m^2/g$ to about 600 $m^2/g$, from about 300 $m^2/g$ to about 550 $m^2/g$, from about 300 $m^2/g$ to about 500 $m^2/g$, from about 300 $m^2/g$ to about 450 $m^2/g$, from about 300 $m^2/g$ to about 400 $m^2/g$, from about 300 $m^2/g$ to about 350 $m^2/g$, from about 350 $m^2/g$ to about 600 $m^2/g$, from about 350 $m^2/g$ to about 550 $m^2/g$, from about 350 $m^2/g$ to about 500 $m^2/g$, from about 350 $m^2/g$ to about 450 $m^2/g$, from about 350 $m^2/g$ to about 400 $m^2/g$, from about 400 $m^2/g$ to about 600 $m^2/g$, from about 400 $m^2/g$ to about 550 $m^2/g$, from about 400 $m^2/g$ to about 500 $m^2/g$, from about 400 $m^2/g$ to about 450 $m^2/g$, from about 450 $m^2/g$ to about 600 $m^2/g$, from about 450 $m^2/g$ to about 550 $m^2/g$, from about 450 $m^2/g$ to about 500 $m^2/g$, from about 500 $m^2/g$ to about 600 $m^2/g$, from about 500 $m^2/g$ to about 550 $m^2/g$, or from about 550 $m^2/g$ to about 600 $m^2/g$. The surface area of a metal oxide nanoparticle may directly correlate to the reaction rate constant (k) of the reaction between the nanoparticles and the decomposition products of the molten salt bath, as described herein. That is, the greater the surface area of the nanoparticle, the greater the potential for reaction with the decomposition products present within the molten salt bath. This may allow for greater control over the properties of the salt bath composition and increased chemical durability of the glass article while using fewer nanoparticles.

In embodiments, the nanoparticles of the salt bath composition may have an average particle size of from about 1 nm to about 25 nm, as measured by the Brunauer-Emmett-Teller (BET) method. For example, the nanoparticles of the salt bath composition may have an average particle size of from about 1 nm to about 20 nm, from about 1 nm to about 15 nm, from about 1 nm to about 10 nm, from about 1 nm to about 5 nm, from about 1 nm to about 2.5 nm, from about 2.5 nm to about 25 nm, from about 2.5 nm to about 20 nm, from about 2.5 nm to about 15 nm, from 2.5 nm to about 10 nm, from about 2.5 nm to about 5 nm, from about 5 nm to about 25 nm, from about 5 nm to about 20 nm, from about 5 nm to about 15 nm, from about 5 nm to about 10 nm, from about 10 nm to about 25 nm, from about 10 nm to about 20 nm, from about 10 nm to about 15 nm, form about 15 nm to about 25 nm, from about 15 nm to about 20 nm, or form about 20 nm to about 25 nm. When the nanoparticles have a smaller average particle size (i.e., less than about 1 nm), the average surface area of the nanoparticles and reaction rate constant (k) may be reduced, resulting in a reduced capacity to interact with the decomposition products. Moreover, when the nanoparticles have a larger average particle size (i.e. greater than about 25 nm), the buoyancy of the nanoparticles within the molten salt bath may be reduced. This may result in the nanoparticles sinking to the bottom of the molten salt bath and decreasing possible interactions and reactions with the decomposition products within the molten salt bath.

In embodiments, the nanoparticles of the salt bath composition may have a high purity such that the nanoparticles comprise greater than 90 wt. % metal oxide or metalloid oxide nanoparticles based on the total weight of the nanoparticles. For example, the nanoparticles of the salt bath composition may comprise from about 90 wt. % to about 99.9 wt. %, from about 90 wt. % to about 99.5 wt. %, from about 90 wt. % to about 99 wt. %, from about 90 wt. % to about 95 wt. %, from about 95 wt. % to about 99.9 wt. %, from about 95 wt. % to about 99.5 wt. %, from about 95 wt. % to about 99 wt. %, from about 99 wt. % to about 99.9 wt. %, from about 99 wt. % to about 99.5 wt. %, or from about 99.5 wt. % to about 99.9 wt. % metal oxide or metalloid oxide nanoparticles based on the total weight of the nanoparticles. When the nanoparticles do not have a sufficiently high purity, contaminants may be introduced into the salt bath compositions that may negatively impact the quality of the strengthened glass articles.

In embodiments, the pH of the molten salt bath comprising the nanoparticles is from 6 to 8. For example, the pH of the molten salt bath comprising the nanoparticles may be from about 6 to about 7.5, from about 6 to about 7, from about 6 to about 6.5, from about 6.5 to about 8, about 6.5 to about 7.5, from about 6.5 to about 7, from about 7 to about 8, about 7 to about 7.5, or from about 7.5 to about 8. As described hereinabove, alkali hydroxides, such as potassium hydroxide, may etch the surface of the glass article, lowering chemical durability. However, in embodiments the metal oxide nanoparticles present within the molten salt bath may react with the decomposition products of the alkali metal nitrate. This may reduce the concentration of alkali hydroxides present in the molten salt bath. That is, the metal oxide nanoparticles may act as a pH buffer in the molten salt bath. As a result, the pH of the molten salt bath may be a reliable indicator as to the degree of etching that may occur during the strengthening process. For example, a basic pH (i.e., a pH greater than 7) may indicate a higher concentration of potassium hydroxide in the molten salt bath and the potential for increased etching. An acidic pH (i.e., a pH less than 7) may indicate a reduced concentration of potassium hydroxide within the molten salt bath and a decreased potential for etching.

In embodiments, the glass article is removed from contact with the molten salt bath after the ion exchange process. The resulting glass article, which has undergone ion exchange, may have a compressive stress at its surface that extends to a depth of compression. The compressive stress and depth of compression increase the resistance of the glass article to breakage following mechanical insults and, as a result, the glass article may be a strengthened glass article after the ion exchange process. However, due to the presence of metal oxide nanoparticles within the molten salt bath, as described hereinabove, the strengthened glass article may retain or even exhibit improved chemical durability as indicated by the SHR titrant volume following ion exchange. As such, in embodiments the strengthened glass article may have a SHR titrant volume of less than 1.5 mL, less than or equal to 1.4 mL, less than or equal to 1.3 mL, less than or equal to 1.2 mL, less than or equal to 1.1 mL, less than or equal to 1 mL, less than or equal to 0.9 mL, less than or equal to 0.8 mL, less than or equal to 0.7 mL, less than or equal to 0.6 mL, less than or equal to 0.5 mL, less than or equal to 0.4 mL, less than or equal to 0.3 mL, less than or equal to 0.2 mL, or even less than or equal to 0.1 mL.

In embodiments, the strengthened glass article may be rinsed or washed after removal. Specifically, the ion exchange process may result in the deposit of alkali metal cations on the surface of the glass article, as described hereinabove. The ion exchange process may also result in the deposit of metal oxide nanoparticles on the surface of the glass article as well. The washing of the strengthened glass article may remove at least a portion of the alkali cations and/or the metal oxide nanoparticles. This may further prepare the glass article for desired applications, such as pharmaceutical packaging.

The glass articles subject to the ion exchange processes and salt bath compositions described herein may have various forms. For example, the glass articles may be glass plates, sheets, tubes, container or the like. In embodiments, the glass articles may be glass pharmaceutical packages or glass pharmaceutical containers for containing pharmaceutical compositions, such as liquids, powders and the like. For example, the glass articles described herein may be Vacutainers®, cartridges, syringes, ampoules, bottles, jars, flasks, phials, tubes, beakers, vials or the like.

EXAMPLES

The following examples illustrate one or more features of the present disclosure. It should be understood that these examples are not intended to limit the scope of the disclosure or the appended claims in any manner.

Example 1

In order to observe the capacity of metal oxide nanoparticles to neutralize potassium hydroxide, 0.06 g of $SiO_2$ nanoparticles having an average particle size of approximately 7 nm were dissolved in 1 L of a 0.001 M KOH solution. The solution was then heated to approximately 22° C. and stirred at 400 rpm while the conductivity and pH of the solution were monitored and recorded every 5 minutes. The results are graphically depicted in FIG. 2.

Figure 2:
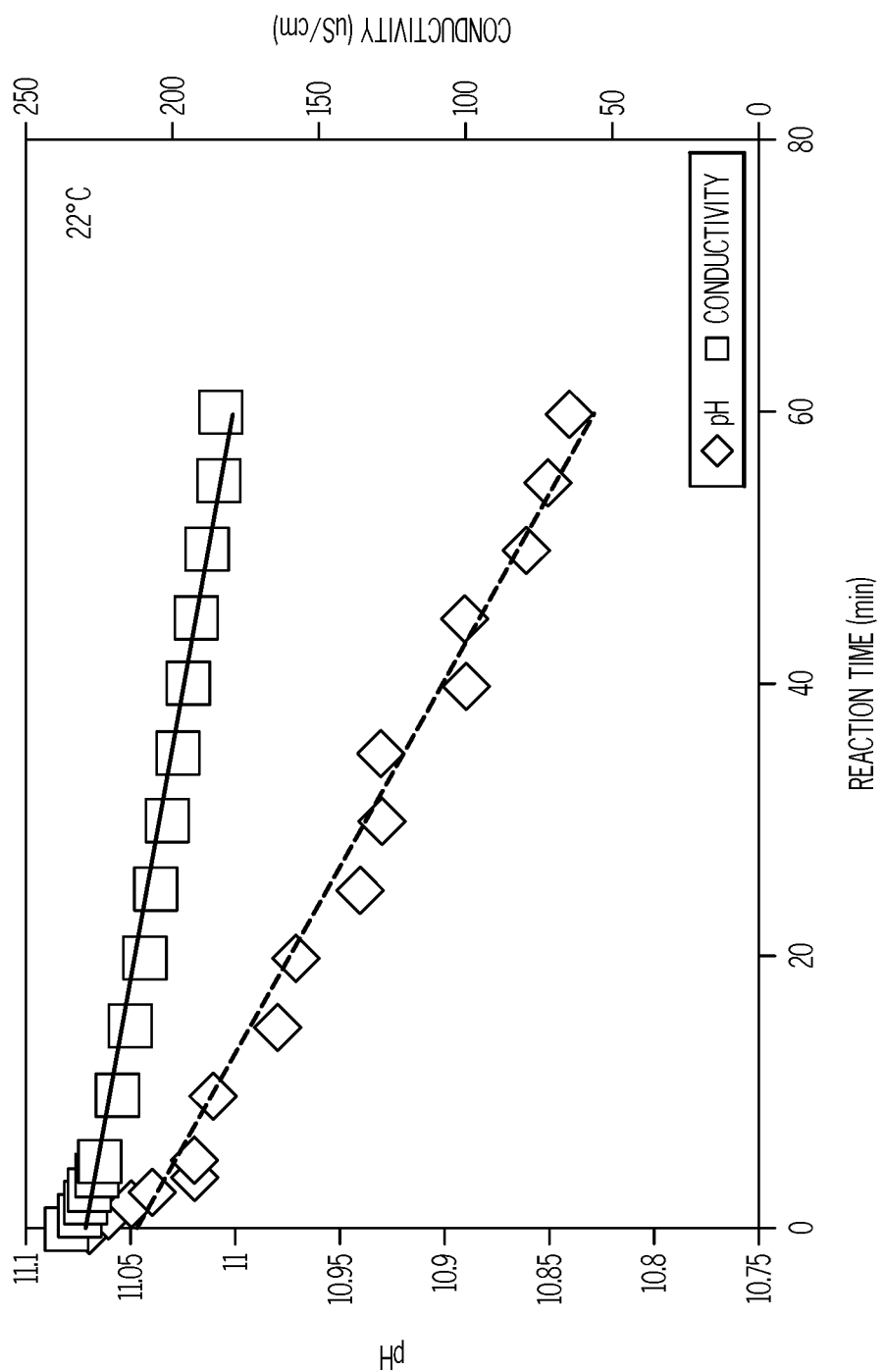
FIG. 2 graphically depicts the pH and conductivity of a solution containing potassium hydroxide and silica nanoparticles over a duration of approximately 60 minutes at a temperature of approximately 22° C.

As shown by the results depicted in FIG. 2, the inclusion of silica nanoparticles within a solution of potassium hydroxide results in a steady decrease in both solution conductivity and pH. As show, the decrease in pH directly correlates with a decrease in conductivity. Without being bound by any particular theory, it is believed that the reduction in both conductivity and pH of the solution may be due to the reduction or elimination of potassium ($K^+$) and hydroxide ($OH^-$) ions within the solution as the silica nanoparticles react with the potassium hydroxide. Over 1 hour, the conductivity of the solution decreased from approximately 225 μS/cm to approximately 175 μS/cm. Similarly, the pH of the solution decreased from approximately 11.05 to approximately 10.85. This reduction in conductivity indicates that the nanoparticles are capable of reducing the concentration of free ions within a solution. That is, the nanoparticles are capable of reacting with or binding ions that are present within a molten salt bath. Similarly, this reduction in pH indicates that nanoparticles may be effective for neutralizing potassium hydroxide within a molten salt bath, mitigating interactions between the potassium hydroxide and the surface of a glass article, and reducing potentially negative effects on chemical durability.

Example 2

The procedure as described in Example 1 was conducted again at a temperature of approximately 50° C. The conductivity and pH of the solution were monitored and recorded every 5 minutes. The results are graphically depicted in FIG. 3.

Figure 3:
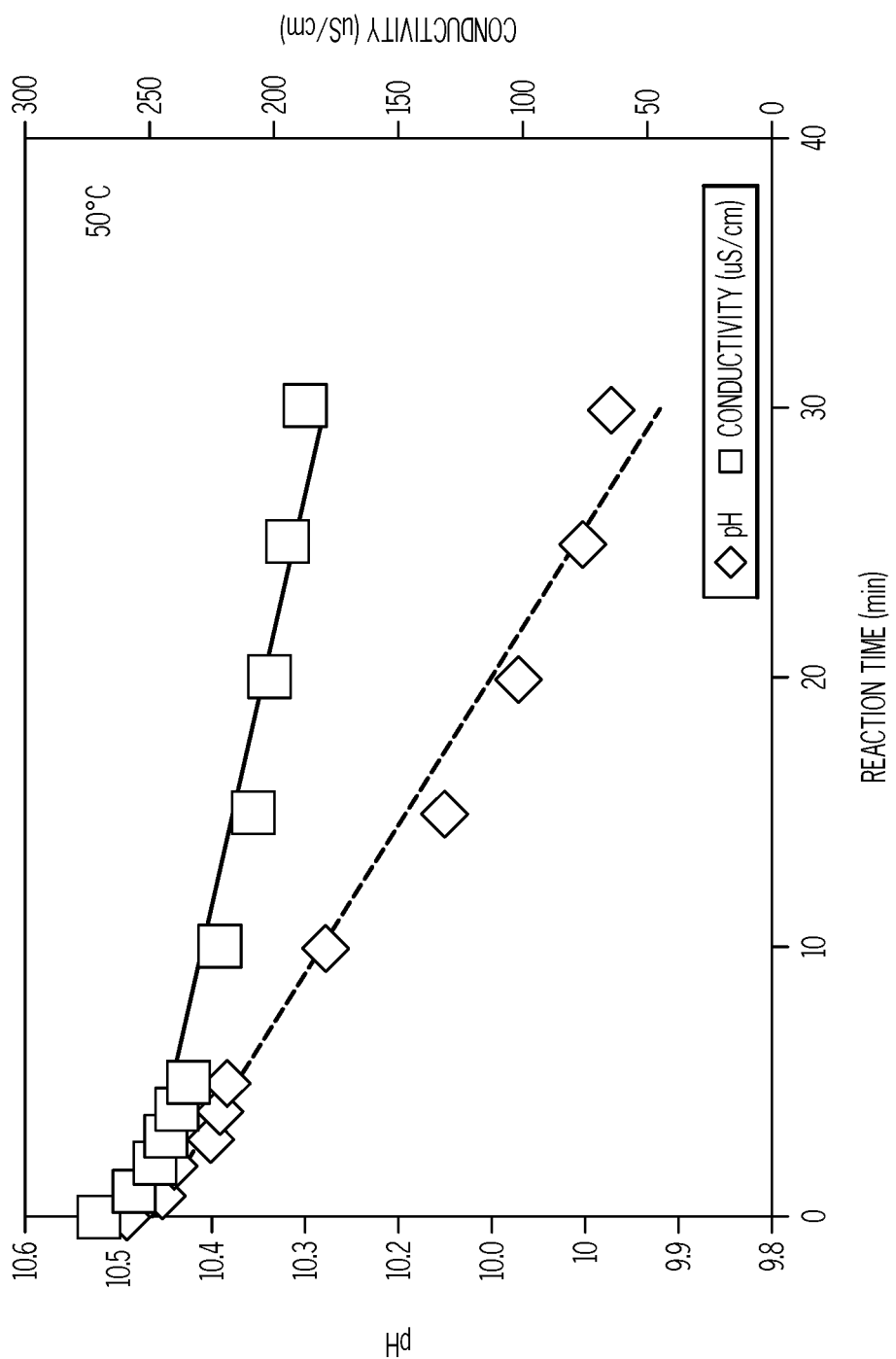
FIG. 3 graphically depicts the pH and conductivity of a solution containing potassium hydroxide and silica nanoparticles over a duration of approximately 30 minutes at a temperature of approximately 50° C.

As shown by the results depicted in FIG. 3, the inclusion of silica nanoparticles within a solution of potassium hydroxide results in a steady decrease in both solution conductivity and pH. Over the course of 30 minutes, the conductivity of the solution decreased from approximately 250 μS/cm to approximately 175 μS/cm. Similarly, the pH of the solution decreased from approximately 10.50 to approximately 9.95. This reduction in conductivity indicates that the nanoparticles are capable of reducing the concentration of free ions within a solution. That is, the nanoparticles are capable of reacting with or binding ions that are present within a molten salt bath. Similarly, this reduction in pH indicates that nanoparticles may be effective at neutralizing potassium hydroxide within a molten salt bath, mitigating interactions between the potassium hydroxide and the surface of a glass article, and reducing potentially negative effects on chemical durability.

Example 3

The procedure as described in Example 1 was conducted again at a temperature of approximately 80° C. The conductivity and pH of the solution were monitored and recorded every 60 seconds. The results are graphically depicted in FIG. 4.

Figure 4:
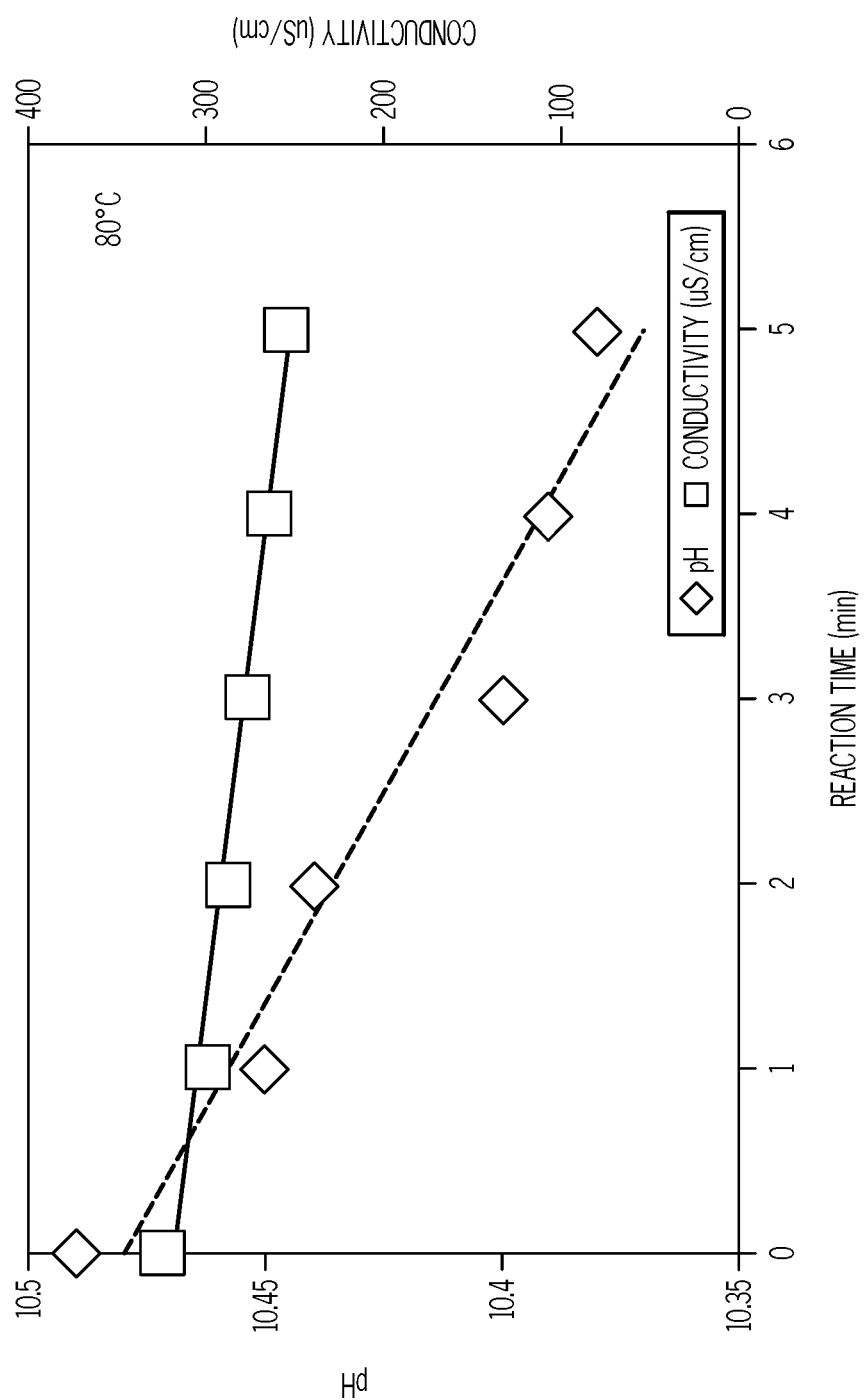
FIG. 4 graphically depicts the pH and conductivity of a solution containing potassium hydroxide and silica nanoparticles over a duration of approximately 5 minutes at a temperature of approximately 80° C.

As shown by the results depicted in FIG. 4, the inclusion of silica nanoparticles within a solution of potassium hydroxide results in a steady decrease in both solution conductivity and pH. Over the course of 5 minutes, the conductivity of the solution decreased from approximately 300 μS/cm to approximately 250 μS/cm. Similarly, the pH of the solution decreased from approximately 10.49 to approximately 10.37. This reduction in conductivity indicates that the nanoparticles are capable of reducing the concentration of free ions within a solution. That is, the nanoparticles are capable of reacting with or binding ions that are present within a molten salt bath. Similarly, this reduction in pH indicates that nanoparticles may be effective at neutralizing potassium hydroxide within a molten salt bath, mitigating interactions between the potassium hydroxide and the surface of a glass article, and reducing potentially negative effects on chemical durability.

Example 4

Using the results of Examples 1-3, the slop of the conductivity measurements were utilized to determine the reaction rate constant (k) of the reaction between silica nanoparticles and potassium hydroxide at the various temperatures of the three examples. The results are depicted as an Arrhenius plot in FIG. 5. That is, FIG. 5 depicts the logarithm of the reaction rate constant (ln(k)) plotted against inverse temperature measured in Kelvin (1/T).

Figure 5:
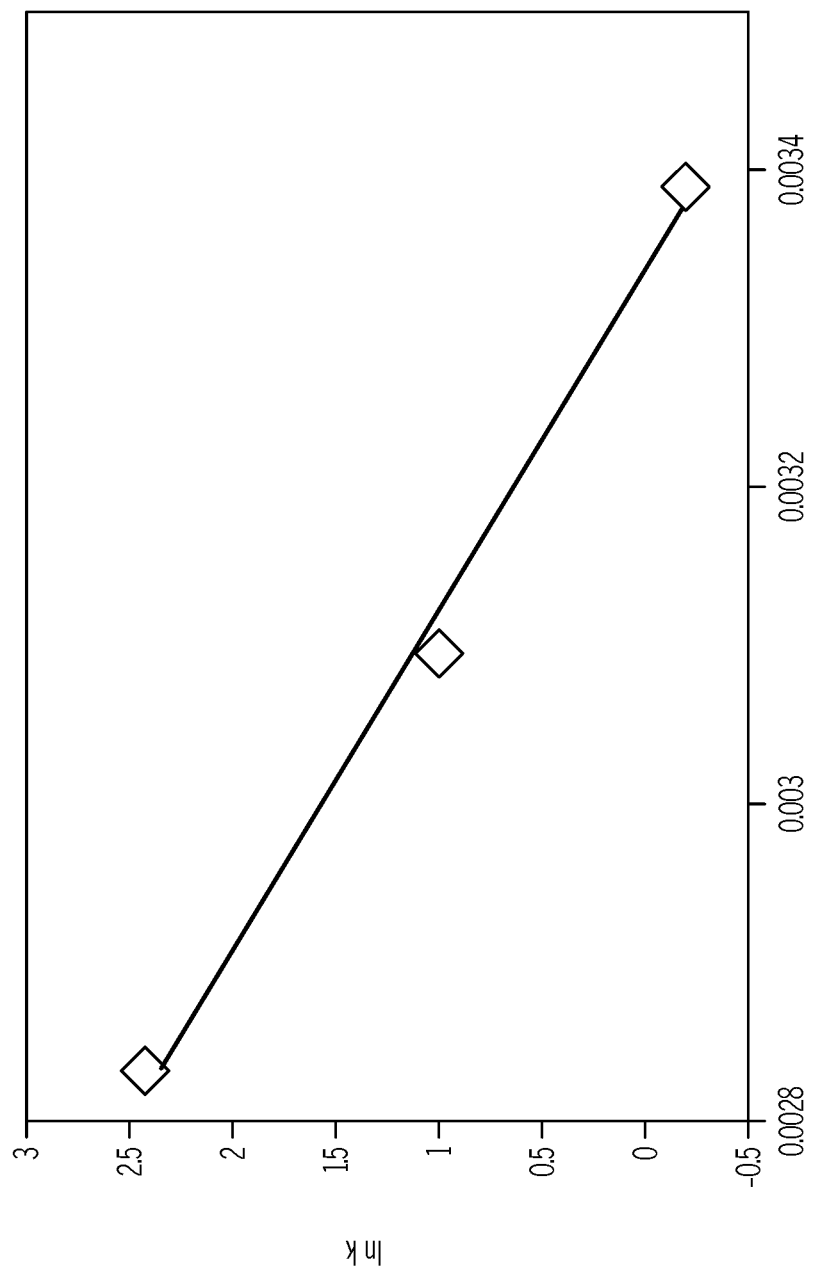
FIG. 5 graphically depicts an Arrhenius plot of the reaction kinetics of potassium hydroxide and silica nanoparticles.

As shown by FIG. 5, the rate at which silica nanoparticles react with potassium hydroxide increases relatively proportionally with an increase in temperature. The reaction rate constant was approximately 0.75 at a temperature of approximately 22° C. The reaction rate constant increased to approximately 2.0 at a temperature of approximately 50° C. The reaction rate increased again to approximately 11.25 at a temperature of approximately 80° C. This reaction rate constant (k) indicates that the nanoparticles may react with the decomposition products of a molten salt bath at a rate sufficient to adequately neutralize bases present within the molten salt bath and mitigate interactions between the base and the surface of a glass article, and reducing potentially negative effects on chemical durability. Moreover, the increase of the reaction rate contestant (k) with the temperature indicates that the effectiveness of the nanoparticles at neutralizing base may increase as the temperature of the solution increases. In this regard, this indicates that the nanoparticles may be effective at reducing the concentration of such bases at the elevated temperatures of a molten salt bath and, as a result, accurately control the pH of the molten salt bath more effectively than conventional methods.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of strengthening an alkali-containing glass article comprising a first alkali metal cation, the method comprising:
    contacting at least a portion of the glass article with a molten salt bath comprising from 0.1 wt. % to 3 wt. % of nanoparticles, the nanoparticles comprising at least one of metalloid oxide nanoparticles and metal oxide nanoparticles, and at least one alkali metal salt comprising a second alkali metal cation, wherein an atomic radius of the second alkali metal cation is larger than an atomic radius of the first alkali metal cation;
    maintaining contact of the at least a portion of the glass article with the molten salt bath to allow the first alkali metal cations in the glass article to be exchanged with the second alkali metal cations of the molten salt bath; and
    removing the at least a portion of the glass article from contact with the molten salt bath to produce a strengthened glass article, wherein a Surface Hydrolytic Resistance titration volume of the strengthened glass article is less than 1.5 mL,
    wherein the molten salt bath comprises a combination of $NaNO_3$ and $KNO_3$, and
    wherein the nanoparticles comprise a combination of $SiO_2$, $Al_2O_3$, and at least one of $TiO_2$ and BeO.

2. The method of claim 1, wherein the metal oxide nanoparticles have an average surface area of from 300 $m^2$/g to 600 $m^2$/g.

3. The method of claim 1, wherein the nanoparticles have an average particle size of from 1 nm to 25 nm.

4. The method of claim 1, wherein a pH of the molten salt bath is from 6 to 8.

5. The method of claim 1, wherein the glass article is at least one of a glass pharmaceutical package and a glass vial.

6. The method of claim 1, wherein a temperature of the salt bath is from 350° C. to 500° C.

7. The method of claim 1, further comprising washing the strengthened glass article to remove at least a portion of the metal oxide nanoparticles.

* * * * *